(12) United States Patent
Wan

(10) Patent No.: US 8,161,548 B1
(45) Date of Patent: Apr. 17, 2012

(54) MALWARE DETECTION USING PATTERN CLASSIFICATION

(75) Inventor: Justin Wan, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 1070 days.

(21) Appl. No.: 11/204,567

(22) Filed: Aug. 15, 2005

(51) Int. Cl.
*G06F 21/00* (2006.01)

(52) U.S. Cl. ............... 726/22; 726/23; 726/24; 726/25; 713/188

(58) Field of Classification Search .................. 709/206; 726/22–25; 713/188; 706/20
See application file for complete search history.

(56) References Cited

U.S. PATENT DOCUMENTS

| | | | |
|---|---|---|---|
| 5,381,545 A | 1/1995 | Baker et al. | |
| 5,907,834 A * | 5/1999 | Kephart et al. ................ | 706/20 |
| 5,950,003 A | 9/1999 | Kaneshiro et al. | |
| 6,002,869 A | 12/1999 | Hinckley | |
| 6,067,410 A | 5/2000 | Nachenberg | |
| 6,128,630 A | 10/2000 | Shackelford | |
| 6,161,130 A * | 12/2000 | Horvitz et al. ................ | 709/206 |
| 6,266,811 B1 | 7/2001 | Nabahi | |
| 6,539,501 B1 | 3/2003 | Edwards | |
| 6,785,818 B1 | 8/2004 | Sobel et al. | |
| 6,877,109 B2 | 4/2005 | Delaney et al. | |
| 6,973,577 B1 * | 12/2005 | Kouznetsov ................... | 726/25 |
| 6,993,537 B2 | 1/2006 | Buxton et al. | |
| 7,039,830 B2 | 5/2006 | Qin | |
| 7,047,303 B2 | 5/2006 | Lingafelt et al. | |
| 7,093,239 B1 | 8/2006 | van der Made | |
| 7,096,368 B2 | 8/2006 | Kouznetsov et al. | |
| 7,103,913 B2 | 9/2006 | Arnold et al. | |
| 7,120,901 B2 | 10/2006 | Ferri et al. | |
| 7,155,742 B1 * | 12/2006 | Szor ................................ | 726/25 |
| 7,181,583 B2 | 2/2007 | Saika | |
| 7,188,369 B2 | 3/2007 | Ho et al. | |
| 7,228,566 B2 | 6/2007 | Caceres et al. | |
| 7,234,076 B2 | 6/2007 | Daynes et al. | |
| 7,263,616 B1 | 8/2007 | Brackett | |
| 7,308,449 B2 | 12/2007 | Fairweather | |
| 7,370,360 B2 | 5/2008 | van der Made | |
| 7,376,970 B2 | 5/2008 | Marinescu | |
| 7,398,553 B1 | 7/2008 | Li | |
| 7,409,719 B2 | 8/2008 | Armstrong et al. | |
| 7,441,234 B2 | 10/2008 | Cwalina et al. | |
| 7,487,543 B2 | 2/2009 | Arnold et al. | |
| 7,526,809 B2 | 4/2009 | Liang et al. | |

(Continued)

OTHER PUBLICATIONS

Office Action dated Jun. 3, 2009 in U.S. Appl. No. 11/356,600.

(Continued)

*Primary Examiner* — Vivek Srivastava
*Assistant Examiner* — Thong Truong
(74) *Attorney, Agent, or Firm* — Beyer Law Group LLP

(57) ABSTRACT

A malware classifier uses features of suspect software to classify the software as malicious or not. The classifier uses a pattern classification algorithm to statistically analyze computer software. The classifier takes a feature representation of the software and maps it to the classification label with the use of a trained model. The feature representation of the input computer software includes the relevant features and the values of each feature. These features include the categories of: applicable software characteristics of a particular type of malware; dynamic link library (DLL) and function name strings typically occurring in the body of the malware; and other alphanumeric strings commonly found in malware. By providing these features and their values to the classifier, the classifier is better able to identify a particular type of malware.

22 Claims, 16 Drawing Sheets

U.S. PATENT DOCUMENTS

| | | | |
|---|---|---|---|
| 7,562,391 B1 | 7/2009 | Nachenberg et al. | |
| 7,565,382 B1 | 7/2009 | Sobel | |
| 7,577,943 B2 | 8/2009 | Chilimbi et al. | |
| 7,581,136 B2 | 8/2009 | Osaki | |
| 7,587,760 B1 | 9/2009 | Day | |
| 7,636,946 B2 | 12/2009 | Verma et al. | |
| 7,664,923 B2 | 2/2010 | Kim et al. | |
| 2002/0178374 A1 | 11/2002 | Swimmer et al. | |
| 2003/0023733 A1 | 1/2003 | Lingafelt et al. | |
| 2003/0041316 A1 | 2/2003 | Hibbeler et al. | |
| 2003/0065926 A1* | 4/2003 | Schultz et al. | 713/188 |
| 2003/0159070 A1 | 8/2003 | Mayer et al. | |
| 2003/0159133 A1 | 8/2003 | Ferri et al. | |
| 2003/0187853 A1 | 10/2003 | Hensely et al. | |
| 2003/0191782 A1 | 10/2003 | Buxton et al. | |
| 2003/0208500 A1 | 11/2003 | Daynes et al. | |
| 2003/0212902 A1 | 11/2003 | van der Made | |
| 2004/0015712 A1 | 1/2004 | Szor | |
| 2004/0015879 A1 | 1/2004 | Pauw et al. | |
| 2004/0034794 A1 | 2/2004 | Mayer et al. | |
| 2004/0034813 A1 | 2/2004 | Chaboud et al. | |
| 2004/0064736 A1 | 4/2004 | Obrecht et al. | |
| 2004/0073653 A1 | 4/2004 | Hunt et al. | |
| 2004/0098607 A1 | 5/2004 | Alagna et al. | |
| 2004/0111557 A1 | 6/2004 | Nakatani et al. | |
| 2004/0128355 A1* | 7/2004 | Chao et al. | 726/22 |
| 2004/0153878 A1 | 8/2004 | Bromwich et al. | |
| 2004/0158819 A1 | 8/2004 | Cuomo et al. | |
| 2004/0199827 A1 | 10/2004 | Muttik et al. | |
| 2004/0215972 A1* | 10/2004 | Sung et al. | 713/201 |
| 2004/0250107 A1 | 12/2004 | Guo | |
| 2005/0033553 A1 | 2/2005 | Swaine et al. | |
| 2005/0060528 A1 | 3/2005 | Kim | |
| 2005/0060699 A1 | 3/2005 | Kim et al. | |
| 2005/0081053 A1 | 4/2005 | Aston et al. | |
| 2005/0216759 A1 | 9/2005 | Rothman et al. | |
| 2005/0268338 A1 | 12/2005 | van der Made | |
| 2006/0015940 A1 | 1/2006 | Zamir et al. | |
| 2006/0041942 A1 | 2/2006 | Edwards | |
| 2006/0047931 A1 | 3/2006 | Saika | |
| 2006/0075499 A1 | 4/2006 | Edwards et al. | |
| 2006/0123481 A1 | 6/2006 | Bhatnagar et al. | |
| 2006/0136720 A1 | 6/2006 | Armstrong et al. | |
| 2006/0136771 A1 | 6/2006 | Watanabe | |
| 2006/0137010 A1 | 6/2006 | Kramer et al. | |
| 2006/0150256 A1 | 7/2006 | Fanton et al. | |
| 2006/0156397 A1 | 7/2006 | Dai | |
| 2006/0173935 A1 | 8/2006 | Merchant et al. | |
| 2006/0230451 A1 | 10/2006 | Kramer et al. | |
| 2006/0236049 A1 | 10/2006 | Iwamura | |
| 2006/0242636 A1 | 10/2006 | Chilimbi et al. | |
| 2006/0242701 A1 | 10/2006 | Black et al. | |
| 2007/0006304 A1 | 1/2007 | Kramer et al. | |
| 2007/0022287 A1 | 1/2007 | Beck et al. | |
| 2007/0028110 A1 | 2/2007 | Brennan | |
| 2007/0074169 A1 | 3/2007 | Chess et al. | |
| 2007/0088970 A1 | 4/2007 | Buxton et al. | |
| 2007/0094728 A1 | 4/2007 | Julisch et al. | |
| 2007/0094734 A1 | 4/2007 | Mangione-Smith et al. | |
| 2007/0150957 A1 | 6/2007 | Hartrell et al. | |
| 2007/0162975 A1 | 7/2007 | Overton et al. | |
| 2007/0168285 A1 | 7/2007 | Girtakovskis et al. | |
| 2007/0180528 A1 | 8/2007 | Kane | |
| 2007/0256127 A1 | 11/2007 | Kraemer et al. | |
| 2007/0271273 A1 | 11/2007 | Cradick et al. | |
| 2008/0066069 A1 | 3/2008 | Verbowski et al. | |
| 2008/0256137 A1 | 10/2008 | Kawamura et al. | |
| 2008/0289042 A1 | 11/2008 | Bai et al. | |
| 2009/0055166 A1 | 2/2009 | Moyle | |
| 2009/0083855 A1 | 3/2009 | Apap et al. | |

OTHER PUBLICATIONS

Office Action dated Jun. 15, 2009 in U.S. Appl. No. 11/247,349.
Office Action dated Sep. 15, 2009 in U.S. Appl. No. 11/181,320.
Office Action dated Feb. 18, 2009 in U.S. Appl. No. 11/181,320.
Office Action dated Jan. 16, 2009 in U.S. Appl. No. 11/247,349.
Notice of Allowance dated Jun. 1, 2010 in U.S. Appl. No. 11/181,320.
Office Action dated Dec. 10, 2009 in U.S. Appl. No. 11/247,349.
Notice of Allowance dated Jun. 1, 2010 in U.S. Appl. No. 11/247,349.
Office Action dated Dec. 22, 2009 in U.S. Appl. No. 11/356,600.
Office Action dated Apr. 2, 2010 in U.S. Appl. No. 11/356,600.
Notice of Allowance dated Aug. 3, 2010 in U.S. Appl. No. 11/356,600.

* cited by examiner

| Function Name String | Feature Value |
|---|---|
|  |  |
| Count_AutoStart_Keys | Number of auto-start registry keys found in the body of the software. |
| Count_Binding_Keys | Number of file binding registry keys found in the body of the software |
| Count_Binding_Keys | Number of file binding registry keys found in the body of the sotware. |
| Count_EXE_Files | Number of strings ending with ".exe" found in the body of the software. |
| Call_Socket_Connect | 1 or 0. Whether the software calls *Connect*. |
| Call_CreateFile | 1 or 0. Whether the software calls *CreateFile*. |
| Call_CopyFile | 1 or 0. Whether the software calls *CopyFile*. |
| Call_DeleteFile | 1 or 0. Whether the software calls *DeleteFile*. |
| Call_GetWindowsDirectory | 1 or 0. Whether the software calls *GetWindowsDirectory*. |
| Call_MAPISendmail | 1 or 0. Whether the software calls *MAPISendMail*. |
| Call_Outlook | 1 or 0. Whether the software calls *Outlook*. |
| Call_OutlookExpress | 1 or 0. Whether the software calls *OutlookExpress*. |
| Call_Word | 1 or 0. Whether the software calls *Word*. |
| Count_HTML_Tags | Number of HTML tags in the body of the software. |
| Count_Kazza | Number of strings with "Kazza" in it. |
| Count_MSN | Number of strings with "MSN Messenger" in it. |
| Count_AOL | Number of strings with "AOL" in it. |
| Count_Crack | Number of strings with "Crack" in it. |

FIG. 3

Function Names as Features

| Field | Value |
|---|---|
| Major Linker Version | 0 |
| Major Linker Version | 0 |
| SizeOfImage | 217762 |
| SizeOfCode/SizeOfImage | 0.13 |
| SizeOfImitializedCode/SizeOfImage | 0.79 |
| ImportTableSize/SizeOfImage | 0.00028 |
| ResourceSize/SizeOfImage | 0.75 |
| Entry Point Location | Third Section |

310

User32.dll, Ws2_32.dll, comct132.dll, aAvapi32.dll, ntdll.dll

320

TFTP Strings

Game Names

Software\Microsoft\Windows\currentversion

330

300

FIG. 4
Worm Features Example

```
<feature-set name="pe-header">
        <feature name="pe/packed"/>
        <feature name="pe/number-of-sections" range="0,30"/>
        <feature name="pe/length" range="0,3978672"/>
        <feature name="pe/code-size"/>
        <feature name="pe/initialized-data-size"/>
        <feature name="pe/uninitialized-data-size"/>
        <feature name="pe/import-table-size"/>
        <feature name="pe/resource-table-size"/>
</feature-set>
```

FIG. 10A   704

```xml
<feature-set name="advapi32.dll" mode="winapi">
    <feature name="match/advapi32.dll" mode="exact"/>
    <feature name="match/RegSetValueEx"/>
    <feature name="match/RegDeleteValue"/>
    <feature name="match/RegEnumValue"/>
    <feature name="match/RegDeleteKey"/>
    <feature name="match/RegCloseKey"/>
    <feature name="match/RegQueryValueEx"/>
    <feature name="match/RegCreateKeyEx"/>
    <feature name="match/RegOpenKeyEx"/>
    <feature name="match/GetUserName"/>
    <feature name="match/GetUserNameEx"/>
    <feature name="match/SetSecurityDescriptorDacl"/>
    <feature name="match/InitializeSecurityDescriptor"/>
    <feature name="match/ChangeServiceConfig"/>
    <feature name="match/ChangeServiceConfig2"/>
    <feature name="match/CloseServiceHandle"/>
    <feature name="match/CreateService"/>
    <feature name="match/OpenSCManager"/>
    <feature name="match/ControlService"/>
    <feature name="match/DeleteService"/>
    <feature name="match/OpenService"/>
    <feature name="match/StartService"/>
    <feature name="match/SetServiceStatus"/>
    <feature name="match/RegisterServiceCtrlHandler"/>
    <feature name="match/StartServiceCtrlDispatcher"/>
    <feature name="match/AdjustTokenPrivileges"/>
    <feature name="match/LookupPrivilegeValue"/>
    <feature name="match/OpenProcessToken"/>
</feature-set>
```
— 708

```xml
<feature-set name="dnsapi.dll" mode="winapi">
    <feature name="match/dnsapi.dll" mode="exact"/>
    <feature name="match/DnsQuery_"/>
    <feature name="match/DnsQueryEx"/>
</feature-set>
```
— 712

FIG. 10B

```xml
<feature-set name="kernel32.dll" mode="winapi">
    <feature name="match/kernel32.dll" mode="exact"/>
    <feature name="match/CreateThread"/>
    <feature name="match/CreatePipe"/>
    <feature name="match/CreateProcess"/>
    <feature name="match/PeekNamedPipe"/>
    <feature name="match/WriteFile"/>
    <feature name="match/GetSystemDirectory"/>
    <feature name="match/DeleteFile"/>
    <feature name="match/CreateFile"/>
    <feature name="match/CreateRemoteThread"/>
    <feature name="match/WriteProcessMemory"/>
    <feature name="match/OpenProcess"/>
    <feature name="match/InitializeCriticalSection"/>
    <feature name="match/DeleteCriticalSection"/>
    <feature name="match/EnterCriticalSection"/>
    <feature name="match/LeaveCriticalSection"/>
</feature-set>
```
— 716

```xml
<feature-set name="mapi32.dll" mode="winapi">
    <feature name="match/mapi32.dll" mode="exact"/>
    <feature name="match/MAPISaveMail"/>
    <feature name="match/MAPISendMail"/>
    <feature name="match/MAPIFreeBuffer"/>
    <feature name="match/MAPIReadMail"/>
    <feature name="match/MAPIFindNext"/>
    <feature name="match/MAPLogon"/>
</feature-set>
```
— 720

```xml
<feature-set name="mpr.dll" mode="winapi">
    <feature name="match/mpr.dll" mode="exact"/>
    <feature name="match/WNetAddConnection"/>
    <feature name="match/WNetAddConnection2"/>
    <feature name="match/WNetAddConnection3"/>
    <feature name="match/WNetCancelConnection"/>
    <feature name="match/WNetCancelConnection2"/>
    <feature name="match/WNetOpenEnum"/>
</feature-set>
```
— 724

```xml
<feature-set name="netapi32.dll" mode="winapi">
    <feature name="match/netapi32.dll" mode="exact"/>
    <feature name="match/NetUseAdd"/>
    <feature name="match/NetUseDel"/>
    <feature name="match/NetApiBufferFree"/>
    <feature name="match/NetShareEnum"/>
    <feature name="match/NetUserEnum"/>
    <feature name="match/NetScheduleJobAdd"/>
    <feature name="match/NetRemoteTOD"/>
</feature-set>
```
— 728

FIG. 10C

```
<feature-set name="ole32.dll" mode="winapi">
        <feature name="match/ole32.dll" mode="exact"/>
        <feature name="match/CoInitialize"/>
        <feature name="match/CoInitializeEx"/>
</feature-set>
```
— 732

```
<feature-set name="psapi.dll" mode="winapi">
        <feature name="match/psapi.dll" mode="exact"/>
        <feature name="match/GetModuleBaseNameA"/>
        <feature name="match/EnumProcessModules"/>
        <feature name="match/EnumProcesses"/>
</feature-set>
```
— 736

```
<feature-set name="shell32.dll" mode="winapi">
        <feature name="match/shell32.dll" mode="exact"/>
        <feature name="match/SHSetValue"/>
        <feature name="match/ShellExecute"/>
        <feature name="match/SHFileOperation"/>
        <feature name="match/ShellExecuteEx"/>
        <feature name="match/SHGetSpecialFolderPath"/>
</feature-set>
```
— 740

```
<feature-set name="urlmon.dll" mode="winapi">
        <feature name="match/urlmon.dll" mode="exact"/>
        <feature name="match/URLDownloadToFile"/>
</feature-set>
```
— 744

```
<feature-set name="wininet.dll" mode="winapi">
        <feature name="match/wininet.dll" mode="exact"/>
        <feature name="match/InternetOpen"/>
        <feature name="match/InternetReadFile"/>
        <feature name="match/InternetOpenUrl"/>
        <feature name="match/InternetCloseHandle"/>
</feature-set>
```
— 748

```
<feature-set name="ws2_32.dll" mode="winapi">
        <feature name="match/windsock.dll" mode="exact"/>
        <feature name="match/ws2_32.dll" mode="exact"/>
        <feature name="match/WSAIoctl"/>
        <feature name="match/WSASocket"/>
        <feature name="match/bind"/>
        <feature name="match/connect"/>
        <feature name="match/listen"/>
        <feature name="match/send"/>
        <feature name="match/recv"/>
        <feature name="match/closesocket"/>
</feature-set>
```
— 752

FIG. 10D

```
<feature-set name="autorun" mode="postfix">
      <feature name="match/CurrentVersion\Explorer\Shell Folders"/>"
      <feature name="match/CurrentVersionExploreUser Shell Folders"/>
      <feature name="match/CurrentVersion\Run"/>
      <feature name="match/CurrentVersion\RunOnce"/>
      <feature name="match/CurrentVersion\RunOnceEx"/>
      <feature name="match/CurrentVersion\RunServices"/>
      <feature name="match/CurrentVersion\RunServicesOnce"/>
      <feature name="match/CurrentControlSet\Services\VxD"/>
      <feature name="match/txtfile\shell\open\command"/>
      <feature name="match/regfile\shell\open\command"/>
      <feature name="match/exefile\shell\open\command"/>
</feature-set>
```
⎯ 756

```
<feature-set name="password" mode="exact">
      <feature name="match/passwords" pattern="administrator"/>"
      <feature name="match/passwords" pattern="administrateur"/>"
      <feature name="match/passwords" pattern="administrador"/>"
      <feature name="match/passwords" pattern="password123"/>"
      <feature name="match/passwords" pattern="admin123"/>"
</feature-set>
```
⎯ 760

```
<feature-set name="game" mode="word">
      <feature name="match/Illusion Softworks\Hidden & Dangerous 2"/>"
      <feature name="match/Techland\Chrome"/>
      <feature name="match/Activision\Soldier of Fortune II - Double Helix"/>
      <feature name="match/BioWare\NWN\Neverwinter"/>
      <feature name="match/Westwood\Red Alert"/>
      <feature name="match/IGI 2 Retail"/>
      <feature name="match/Electronic Arts\EA GAMES"/>
      <feature name="match/Electronic Arts\EA Sports"/>
      <feature name="match/Eugen Systems\The Gladiators"/>
      <feature name="match/Unreal Technology"/>
</feature-set>
```
⎯ 764

```
<feature-set name="http" mode="prefix">
      <feature name="match/http" pattern="http://" />
</feature-set>
```
⎯ 768

FIG. 10E

```
<feature-set name="wscriptl" mode="word">
    <feature name="match/Scripting.FileSystemObject"/>
    <feature name="match/Wscript.shell"/>
</feature-set>
```
— 772

```
<feature-set name="mail" mode="prefix">
    <feature name="match/HELO"/>
    <feature name="match/MAIL FROM:"/>
    <feature name="match/RCTP TO:"/>
    <feature name="match/Subject:"/>
    <feature name="match/Message-ID:"/>
    <feature name="match/MIME-Version:"/>
    <feature name="match/Content-Type:"/>
    <feature name="match/Re:"/>
</feature-set>
```
— 776

```
<feature-set name="html" mode="word">
    <feature name="match/<htm>"/>
    <feature name="match/<body"/>
    <feature name="match/</body>"/>
    <feature name="match/</html>"/>
</feature-set>
```
— 780

```
<feature-set name="bat" mode="word">
    <feature name="match/@echo off"/>
    <feature name="match/@break off"/>
    <feature name="match/if exists "/>
    <feature name="match/del "/>
</feature-set>
```
— 784

```
<feature-set name="p2p" mode="word">
    <feature name="match/KaZaA"/>
    <feature name="match/ICQ"/>
    <feature name="match/mIRC"/>
    <feature name="match/emule"/>
    <feature name="match/WinMX"/>
    <feature name="match/MSN Messenger"/>
    <feature name="match/Yahoo Messenger"/>
</feature-set>
```
— 788

*FIG. 10F*

```xml
<?xml version="1.0" encoding="iso-8859-1"?>
<mdxml version="0.1">
    <!-- SVMLight parameters: -c 0 -j 10 -t 0 -- >

<model type="classifier/SVM" name="worm-medium" version="0.1" metadata-
        version="0.1.0 medium" feature-set="worm-full"
        classes="app/normal,app/worm"> <binary-classifier type="linear">

<parameters value="
(-1.0534018, -0.0069835344, 0.4982562, 0.27344639,
0.33679601, -0.60350258, -0.83351616, 0.46227215, 0.28917297, 0.20437285,
-0.99108251, 0.36578832, 0.20633058, -0.38120521, 0.1205632, 0,
-0.085767384, 0, -0.17153477, -0.095600978, 0, 0
0, -0.2832777, 0, 0.18339275, -0.00011052953, -0.00011052953,
0, -0.00011052953, -0.00011052953, -0.00011052953, 0, -0.085877914,
0.19415508, -1.1542606, -1.1159062, -0.3040613, -0.38982868, -0.38982868,
0.29303718, 0.21608571, -0.10317865, -0.073646372, -0.17863943, -0.54000057,
0.11019088, 0.56465162, -0.23139443, -0.68297593, 0, 0,
-0.047890609, -0.32875404, -0.24298665, -0.62813469, 0, -0.24298665,
0, 0, 1.12774977, -0.30185184, 0.16366475, 0.50837035,
0.51536026, -0.31170815, 0.048429679, 0.057832688, 0.15175529, 0.057675253,
-0.085767384, 0.18069244, 0.18069244, -0.17153477, -0.37437906, 0.024552718,
-0.12705038, -0.061214667, 0.17765917, 0.36193012, -0.061214667, -0.22149265,
0.013336311, -0.15919841, 0.013336311, -0.17908355, -0.17908355, 0.40868824,
-0.26169026, -0.45387061, 0, 0.82764852, 0.07764268, -0.25712984,
0.068001829, -0.36382738, 0.015269079, -0.27735499, -0.037129111, -0.24830685,
0.14758548, 0.012290558, -0.027892915, 0.062446241, 0.22470226, -0.16116352,
-0.16116352, -0.48649328, 0.027499384, -0.049951082, 0.096026275, -0.12139352,
-0.12139352, -0.059736591, -0.0050225799, 0.13584596, -0.37920133, 0,
-0.027122016, 0.076757611, -030590892, 0.19259542, -0.12683936, -0.2490846,
0.018226356, -0.54598628, -0.18307338, -0.23287081, -0.20222696, 0.11430628,
0.17659437, -0.060244915, 0.06212256, 0.095747772, -0.29586755, 0.0079912972,
0.37044949, 0, -0.043573884, 0.20375382, 0.015452582, -0.37141444,
-0.037535396, -0.15321735, -0.44478595, 0.0091016659, 0.060950871, -0.17596285,
0.18088116, 0.8103639, -0.45522309, -0.50367056, 0.41058818, 0.012983438,
-0.24481192, 0.087935269, 0.057884987, -0.27501232, -0.67918528) - (-0.98193445)
"/>
        </binary-classifier>
    </model>

</mdxml>
```

FIG. 11

Trained Model Example

MALWARE DETECTION USING PATTERN CLASSIFICATION

FIELD OF THE INVENTION

The present invention relates generally to addressing malicious software in computer systems. More specifically, the present invention relates to malware detection using a pattern classification algorithm based upon features of the malware.

BACKGROUND OF THE INVENTION

Currently, it is common for malicious software such as computer viruses, worms, spyware, etc., to affect a computer such that it will not behave as expected. Malicious software can delete files, slow computer performance, clog e-mail accounts, steal confidential information, cause computer crashes, allow unauthorized access and generally perform other actions that are undesirable or not expected by the user of the computer.

Current technology allows computer users to create backups of their computer systems and of their files and to restore their computer systems and files in the event of a catastrophic failure such as a loss of power, a hard drive crash or a system operation failure. Assuming that the user had performed a backup prior to the failure, it can be straightforward to restore their computer system and files to a state prior to the computer failure. Unfortunately, these prior art techniques are not effective when dealing with infection of a computer by malicious software. It is important to be able to detect such malware when it first becomes present in a computer system, or better yet, before it can be transferred to a user's computer.

Prior art techniques able to detect known malware use a predefined pattern database that compares a known pattern with suspected malware. This technique, though, is unable to handle new, unknown malware. Other prior art techniques use predefined rules or heuristics to detect unknown malware. These rules take into account some characteristics of the malware, but these rules need to be written down manually and are hard to maintain. Further, it can be very time-consuming and difficult to attempt to record all of the rules necessary to detect many different kinds of malware. Because the number of rules is often limited, this technique cannot achieve both a high detection rate and a low false-positive rate.

Given the above deficiencies in the prior art in being able to detect unknown malware efficiently, a suitable solution is desired.

SUMMARY OF THE INVENTION

To achieve the foregoing, and in accordance with the purpose of the present invention, a malware classifier is disclosed that uses features of suspect software to classify the software as malicious or not. The present invention provides the ability to detect a high percentage of unknown malware with a very low false-positive rate.

A malware classifier uses a pattern classification algorithm to statistically analyze computer software in order to categorize it by giving it a classification label. Any suspect computer software is input to the malware classifier with the resulting output being a label that identifies the software as benign, normal software or as a particular type of malicious software. The classifier takes a feature representation of the software and maps it to the classification label with the use of a trained model, or function definition.

The feature representation of the input computer software includes the relevant features and the values of each feature. These features include the categories of: applicable software characteristics of a particular type of malware; dynamic link library (DLL) and function name strings typically occurring in the body of the malware; and other alphanumeric strings commonly found in malware. By providing these features and their values to the classifier, the classifier is better able to identify a particular type of malware.

One embodiment is a method for training a malware classifier. A feature definition file is created that includes features relevant to the identification of the type of malware. Software training data is selected that includes known malware as well as benign software. A training application is executed that outputs a trained model for identifying the particular type of malware.

A second embodiment is a method for classifying suspect software. First, a group of features relevant to a particular type of malware are selected along with a trained model that has been trained to identify the same type of malware. The malware classifier extracts features and their values from suspect software and inputs same to a classification algorithm. The classification algorithm outputs a classification label for the suspect software, identifying it as malware or as benign.

A third embodiment is a malware classifier apparatus. The apparatus includes a feature definition file having features known to be associated with the type of malware, a model being trained to identify that malware, a feature extraction module and a pattern classification algorithm. In one specific embodiment, the classification algorithm is the support vector machine (SVM) algorithm.

BRIEF DESCRIPTION OF THE DRAWINGS

The invention, together with further advantages thereof, may best be understood by reference to the following description taken in conjunction with the accompanying drawings in which:

FIG. 3 is a table illustrating the use of function names as features as well as alphanumeric strings.

FIG. 4 illustrates a list of features and their values from a real-world worm.

FIGS. 10A-10F show portions of a feature definition file.

FIG. 11 is an example showing a trained model output by the training application for the purposes of detecting a computer worm.

DETAILED DESCRIPTION OF THE INVENTION

Figure 1:
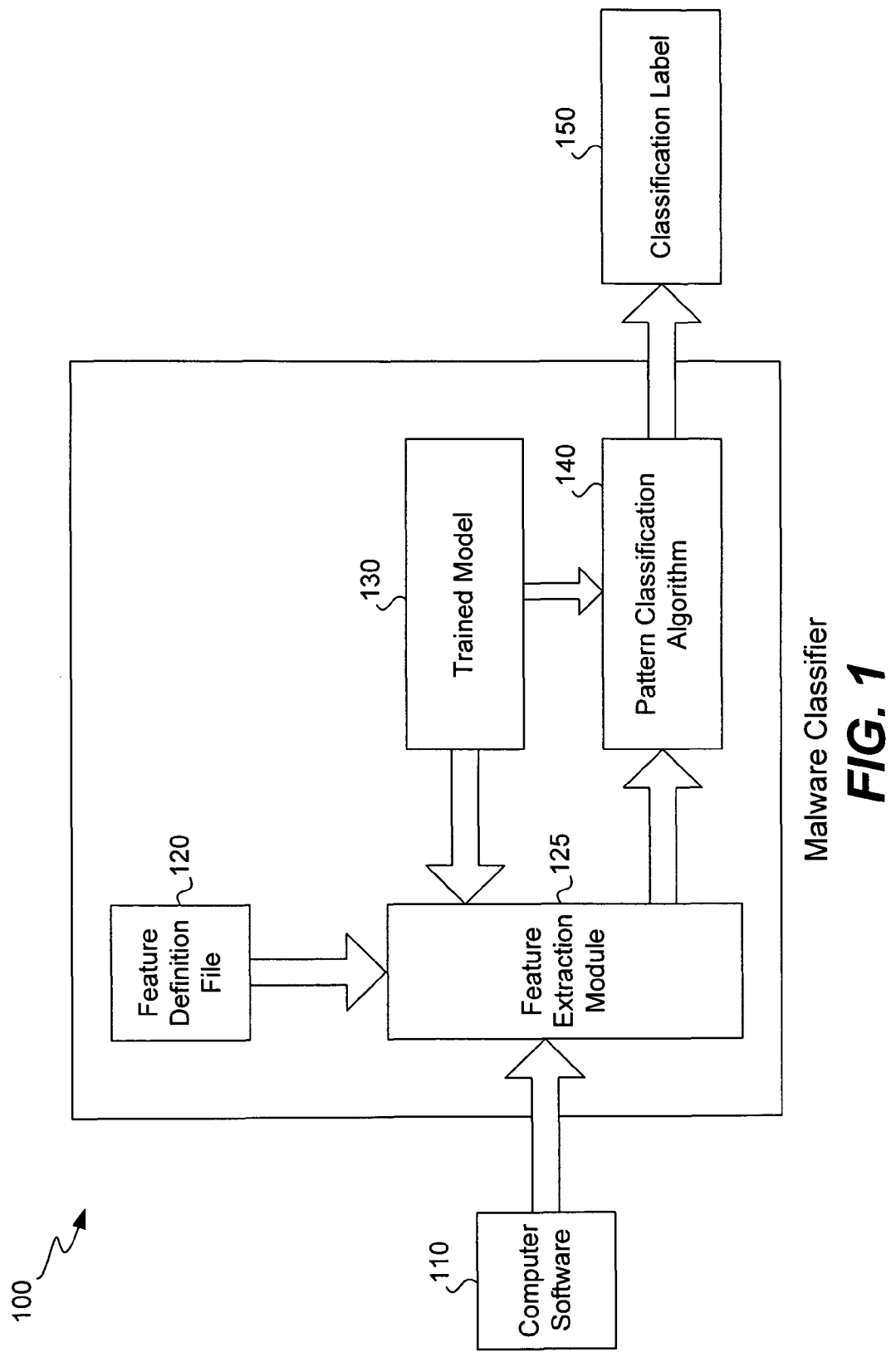
FIG. 1 is a block diagram of a malware classifier according to one embodiment of the invention.

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not perfect in that many groups overlap. Of course, later developed software not currently known may also fall within the definition of malware.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another. Computer worms are similar to viruses but are stand-alone software and thus do not require host files or other types of host code to spread themselves. They do modify the host operating system, however, at least to the extent that they are started as part of the boot process. In order to spread, worms either exploit some vulnerability of the target host or use some kind of social engineering to trick users into executing them.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

Spyware is a piece of software that collects and sends information (such as browsing patterns or credit card numbers) about users and the results of their computer activity without explicit notification. Spyware usually works and spreads like Trojan horses. The category of spyware may also include adware that a user deems undesirable. A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. A dialer is a program that replaces the telephone number in a modem's dial-up connection with a long-distance number (often out of the country) in order to run up telephone charges on pay-per-dial numbers, or dials out at night to send key logger or other information to a hacker. Software known as URL injection software modifies a browser's behavior with respect to some or all domains. It modifies the URL submitted to the server to profit from a given scheme by the content provider of the given domain. This activity is often transparent to the user.

The present invention is suitable for use with a wide variety of types and formats of malware. The below description provides an example of the use of the invention with malware written in the portable executable (PE) format. As is known in the art, the portable executable format is an executable file format used in 32-bit and 64-bit versions of Microsoft operating systems. The portable executable format is a modified version of the UNIX COFF file format. Of course, the present invention applies to computer files in other formats as well.

Malware Classifier

A malware classifier is a software application that uses a pattern classification algorithm to statistically analyze computer software in order to categorize it by giving it a classification label. Any suspect computer software may be input to the malware classifier with the resulting output being a label that identifies the software as benign, normal software or as a particular type of malicious software. The classifier takes a feature representation of the software and maps it to the classification label with the use of a trained model, or function definition.

FIG. 1 is a block diagram of a malware classifier 100 according to one embodiment of the invention. Input to classifier 100 is computer software 110 which is suspected of being malware. A feature definition file 120 lists all relevant features of any potential computer software and the corresponding attributes for each feature. Feature extraction module 125 is computer software that extracts values for the defined features from the input computer software 110. Trained model 130 is the trained classification function in the form of a computer file that is output by a separate training application as described below. Model 130 is trained by mapping a vector of features into one of several classes by looking at many input-output examples. Pattern classification algorithm 140 is any suitable pattern classification algorithm that accepts feature values and the trained model as input and outputs a classification label 150, or class, for the input computer software 110. Classification algorithm 140 is designed to approximate the behavior of the trained model.

As alluded to above, an effective malware classifier relies upon a suitable classification algorithm, a set of features, feature normalization methods, and training samples (i.e., examples of benign software and malware).

Software Features

Current technologies for detecting malware include noting malicious behavior such as an abnormal TCP connection on a given port or the adding of a registry key that automatically loads itself when the operating system starts. Certain types of malware, however, have behaviors that can be difficult to track. A worm, for example, can create processes with different names on different machines and can behave differently on different machines, all of which make its behavior difficult to track.

But, each type of malware exhibits a certain pattern which is different from that of benign computer software. A worm, for example, is likely to call RegCreateKey and RegSetValue, to add an entry in HKLM\Software\Microsoft\CurrentVersion\Run, and to call connect or CopyFile or CreateFile in order to propagate itself. Plus, most of the effort expended by the worm involves propagating itself and damaging files, so there are not many calls to GDI functions or to Common Controls functions. Further, the header of a worm written in a portable executable format will have certain characteristics. Each of the other various types of malware (such as viruses, spyware, adware, etc.) also will have distinctive characteristics and will exhibit distinctive behavior. It is therefore realized that a known pattern classification algorithm may be used to analyze these features of computer software suspected of being malware and to output a result that classifies the computer software as benign or as a particular type of malware.

In one embodiment of the invention, a specific feature definition file is used to classify each type of malware. For example, if it is decided to implement a malware classifier that will detect computer worms then a feature definition file is constructed having specific features relevant to computer worms. On the other hand, if it is desired to detect spyware, a separate feature definition file is used including features known to be present in spyware. Of course, if the goal is to detect computer worms, then training data is supplied to the training application (described below) having examples of computer worms and benign software. The resulting trained model is tuned specifically to detect computer worms and is used in conjunction with a feature definition file containing worm features.

In an alternative embodiment, it is possible that a single feature definition file may be used to detect two or more types of malware. For example, two sets of features identifying two types of malware are combined into one large feature set. Assume features f0, f1 and f2 are for detecting malware type #1, and that features f3, f4 and f5 are for detecting malware type #2. The combined features set f0, f1, f2, f3, f4 and f5 is used to detect malware types #1 and #2 by using a classification algorithm that combines the logic of the classification functions for detecting malware types #1' and #2.

Feature definition file 120 lists all of the relevant features and the attributes of each feature that might possibly be encountered in computer software 110. These features include the categories of: applicable software characteristics; dynamic link library (DLL) and function name strings occurring in the body of the software; and other strings commonly found in malware. Other types of features may also be used.

Figure 2:
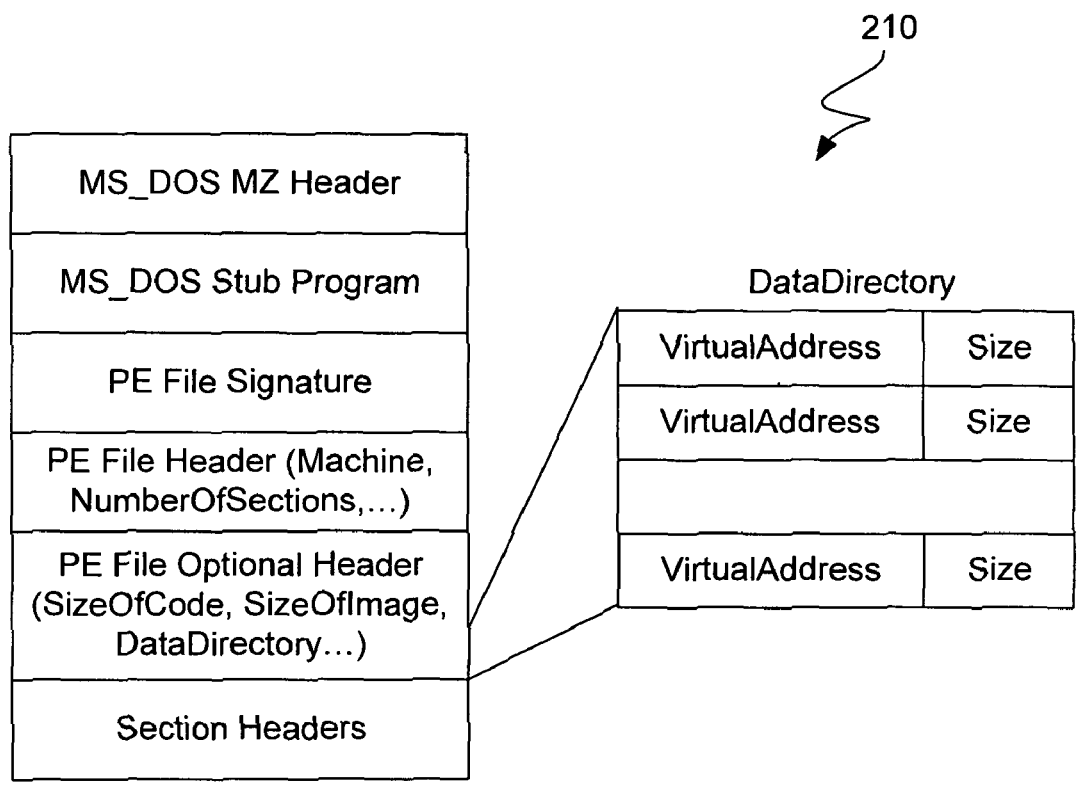
FIG. 2 illustrates the header of a file in portable executable format.

In this embodiment, the applicable software characteristics include the fields of the header of a file in portable executable format. For example, these fields are: packed, packer, number of sections, image size, code section size, import table size, export table size, resource size, subsystem, initialized section size, on initialized section size, image base address, and entry point location. FIG. 2 illustrates the header 210 of a file in portable executable format. Shown is relevant header information that contain suitable characteristics to use as features. Of course, header 210 is specific to a portable executable format, other file types will have other relevant header information and characteristics.

Another category of features include dynamic link library (DLL) and function name strings occurring in the body of the software. This category enumerates DLL name strings and function name strings that might be imported by suspected malware. In this particular embodiment, the enumerated strings are those that might be used by malware in a portable executable format. Each name string is considered a feature and the value of each of these features will either be one or zero depending upon whether the name string occurs in the body of the suspect computer software. For example, consider kernel32.dll, comctl32.dll, urlmon.dll, shell32.dll, advapi32.dll, InterlockedIncrement, GetThreadLocale as features Fk, Fc, Fu, Fs, Fa, Fi and Fg accordingly. For a given suspect computer software, if only the strings "advapi32.dll" and "GetThreadLocale" are found in its body, then the values of Fa and Fg are each one while the other values are all zero. Other possible functions include RegDeleteValue, RegEnumValue, CreateThread and CreatePipe, etc.

FIG. 3 is a table 260 illustrating the use of function names as features, as well as alphanumeric strings described below. This table lists examples of those function names that are commonly associated with malware; many other function names are possible. Column 262 lists examples of function names ("Callxxx") that might appear as strings within the body of suspect computer software, as well as feature names that perform a count of particular alphanumeric strings founds in the software ("Countxxx"). Colume 264 lists the corresponding value for each function name that is considered a feature. While the "Call" feature names will have a value of one or zero, the "Count" feature names will have any integer value depending upon the particular data.

Because many malware programs are packed, leaving only the stub of the import table or perhaps even no import table, the malware classifier will search for the name of the dynamic link library or function in the body of the suspected malware. Adding more function names or dynamic link library names as features will likely yield better classification results.

A third category of features include alphanumeric strings commonly found in malware. These are strings identifying registry keys, passwords, games, e-mail commands, etc. that malware typically uses. The presence of a quantity of these strings in a given computer software program indicates it is more likely than not that the software is malware. For example, a string indicating that computer software has been compressed by tool like UPX is a good indicator that the software might be malware since benign computer software seldom uses that tool. Also, malware often steals and uses the CD keys for some of the common computer games.

Examples of these strings include auto-run registry keys such as

CurrentVersion\Run

CurrentVersion\Run Services

HKLM\Windows\Software\Microsoft\CurrentVersion\Run and

HKCR\exefile\shell\open\command.

Other examples include commonly used passwords such as "administrator," "administrateur," "administrador," "1234," "password123," "admin123," etc.; registry keys or installation paths of games such as "Illusion Softworks\Hidden & Dangerous 2," "Electronic Arts\EA Sports" and "Westwood\Red Alert"; SMTP commands such as "MAIL FROM:" and "RCPT TO:"; peer-to-peer application names such as "KaZaA," "emule," "WinMX," "ICQ," "MSN Messenger," Yahoo Messenger," etc.; HTML syntax such as "<html>, <body>"; and scripting objects such as "WScript.Shell," "Scripting.FileSystemObject," "Word.Application," etc.

These alphanumeric strings are considered features within the malware classifier and the value of each of these features can be either one or zero, indicating whether or not the given string exists in the body of the suspect computer software. A count of the number of times a string appears may also be a feature value. The present embodiment uses around 200 features.

Feature extraction module 125 extracts feature values from suspect computer software 110 corresponding to features present in feature definition file 120. In the embodiment in which software 110 is in the portable executable format, it is first necessary for the extraction module to unpack the file before extracting the feature values.

FIG. 4 illustrates a list of features and their values from a real-world worm titled "WORM.BROPIA.F." As shown in figure, certain characteristics 310 found in the header of the portable executable file have particular feature values. Further, numerous names of dynamic link libraries 320 are found but very few function names are found (not shown). Finally, there are TFTP strings, numerous game names and a registry key 330. Using these features and their values, along with input from trained model 130, classification algorithm 140 outputs an appropriate classification label 150 of "worm."

Classification Algorithm

Pattern classification algorithm 140 is any suitable classification algorithm. A classification algorithm is designed to learn (or to approximate) a function that maps a vector of features into one of several classes by looking at many input-output examples of the function. Any of the standard types of classification algorithms, e.g., Decision Tree, Naïve Bayes, or Neural Network may be used to implement the malware classifier. In a situation where the number of features is high, some algorithms may not be well-suited. In one specific embodiment, the present invention uses the Support Vector Machine algorithm; SVM is described in T. Joachims, *Making Large-Scale SVM Learning Practical*, Advances in Kernel Methods—Support Vector Learning, B. Scholkopf, C. Burges and A. Smola (ed.), MIT Press, 1999. There are many sources of SVM software available, such as: SVM Light, SVM Torch, Libsvm, SVMFu, SMO and many others that can be found at the web site "kernel-machines.org." The present invention makes use of the SVM Light software. An online tutorial regarding the SVM algorithm is found at the web site http://159.226.40.18/tools/support %20vector %20machine.ppt," and documents entitled "SVM Rules of Thumb" are also available on the Internet.

Figure 5:
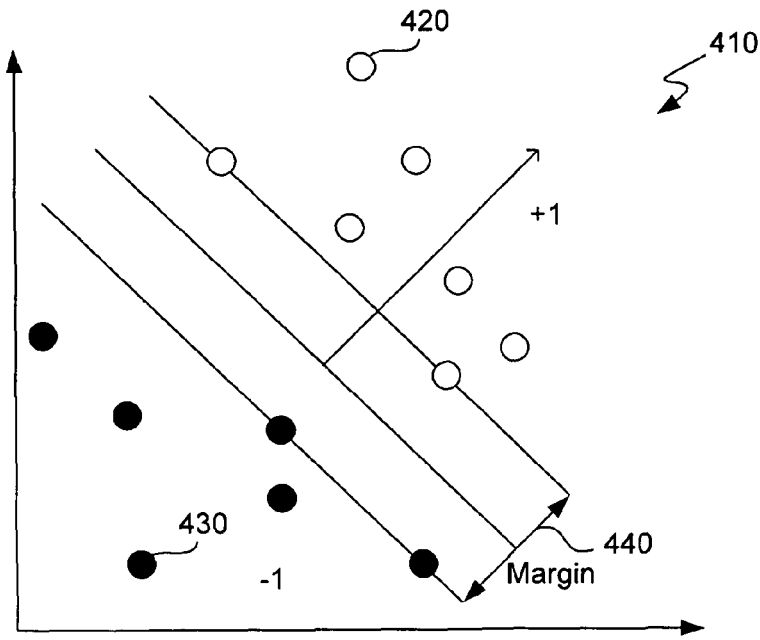
FIG. 5 illustrates a hyper plane used in the SVM algorithm.

FIG. 5 illustrates a hyper plane 410 used in the SVM algorithm. Briefly, the SVM algorithm creates a maximum-margin hyper plane that lies in a transformed input space. Given training samples labeled either "+" 420 or "−" 430, a maximum-margin hyper plane splits the two groups of training samples, such that the distance from the closed samples (the margin 440) to the hyper plane is maximized. For situations such as the one shown in FIG. 5 the training samples are linearly separable.

Figure 6:
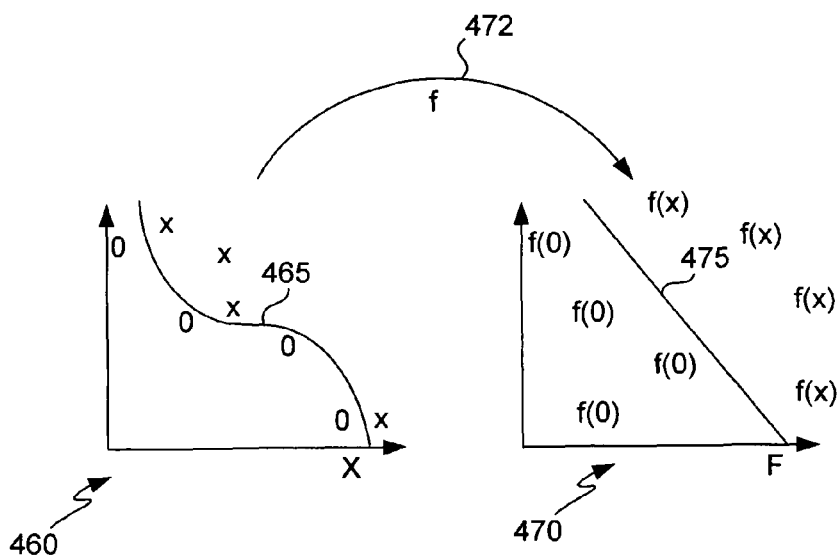
FIG. 6 illustrates a situation in which the training samples are not linearly separable.

FIG. 6 illustrates a situation in which the training samples are not linearly separable. Graph 460 shows a situation in which the samples are not linearly separable and can only be separated by using a curved line 465. A kernel function "f" 472 is thus used to convert the original feature space into a linearly separable one. Graph 470 shows the converted feature space in which the training samples (or rather, their converted values) are now linearly separable using line 475.

Further details regarding operation of the SVM algorithm are omitted as general use of the SVM algorithm is known to those of skill in the art.

Classification of Malware

In general, the classification of computer software 110 involves loading the feature definition file, using the feature extraction module to obtain feature values from the computer software, loading the function definition into the trained model in order to initialize the classification algorithm, and passing the feature values as variables into the classification algorithm that then outputs a classification label for the computer software.

Figure 7:
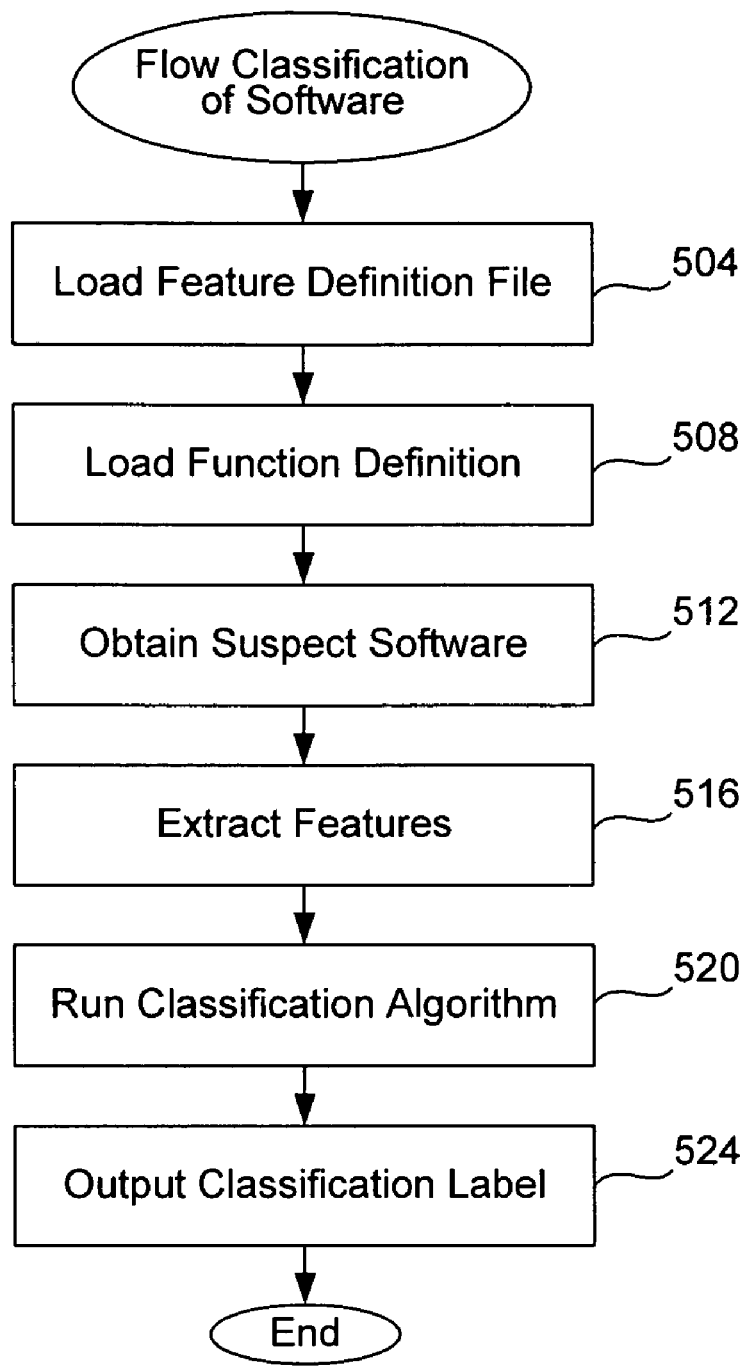
FIG. 7 is a flow diagram describing the classification of computer software.

FIG. 7 is a flow diagram describing the classification of computer software. In step 504 feature definition file 120 is loaded into the malware classifier; the choice of a particular feature definition file will depend upon which type of malware it is desired to classify. In step 508 the trained model 130, or function definition, is also loaded into the malware classifier; again, choice of a particular trained model dictates which type of malware the classifier will be able to detect and classify.

In step 512 the suspect software 110 is obtained and input into the malware classifier 100. The suspect software may originate from a wide variety of sources. By way of example, the malware classifier is integrated into an anti-spyware software product and whenever a file is accessed (i.e., opened or executed) that particular file is input to the malware classifier. In other examples a user may manually select a file or folder of files in order to classify a file, or the classifier may be used upon incoming e-mail attachments, etc.

In step 516 feature extraction module 125 extracts the features and their values from the input software using feature definition file 120. In step 520 the pattern classification algorithm (in this embodiment, the SVM Light software) accept as input the extracted values and by use of the trained model outputs a classification label 150. In the example in which the model is trained to detect computer worms and the feature definition file contains features relevant to worms, the classification label output will be either "worm" or "normal." For the detection of other particular types of malware using suitable models and feature definition files, the classification labels will depend on those types of malware.

Training the Classification Algorithm

Figure 8:
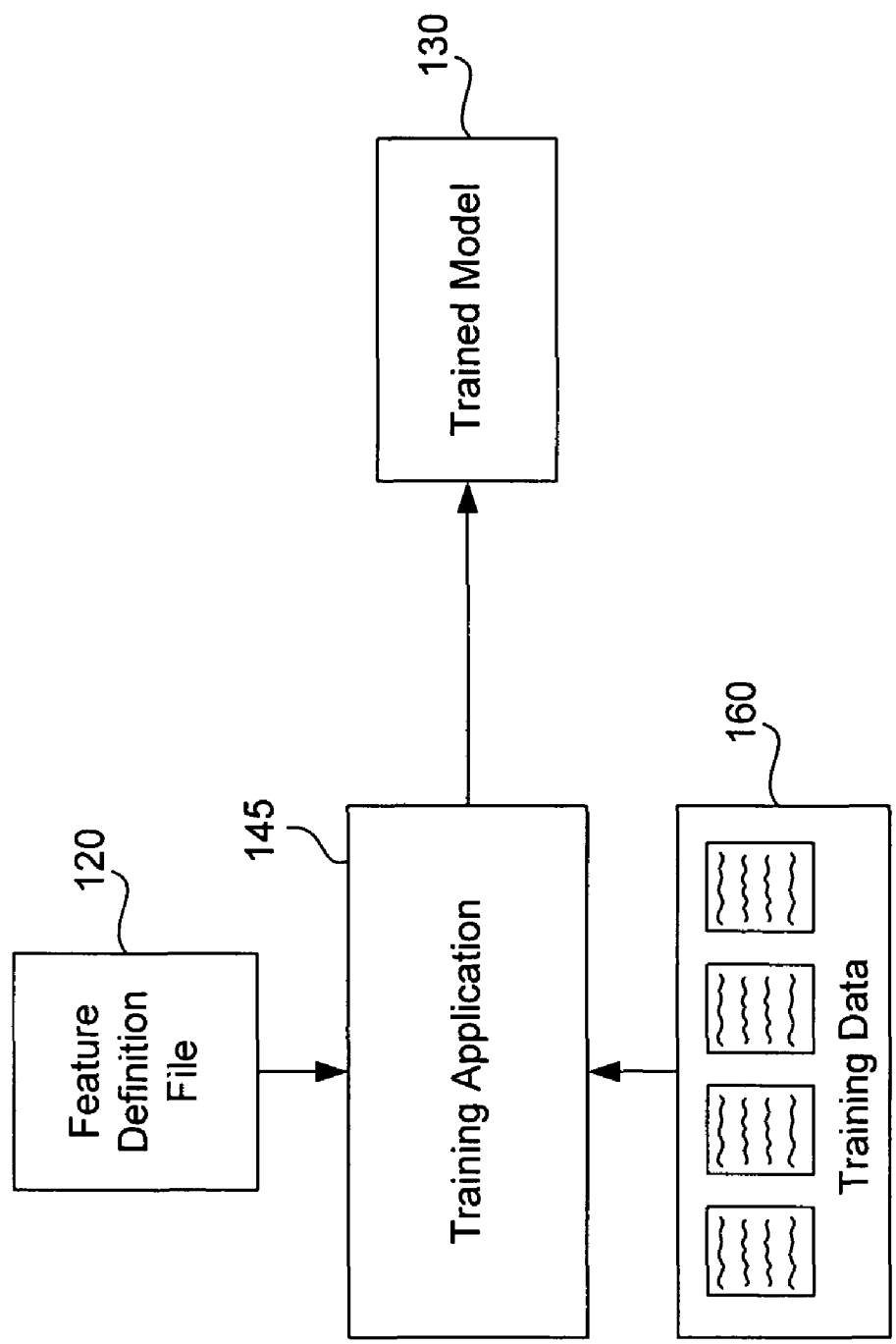
FIG. 8 is a block diagram illustrating the creation of a trained model.

FIG. 8 is a block diagram illustrating the creation of trained model 130. Training application 145 depends on feature definition file 120 and includes feature extraction module 125. Training application 145 takes both normal computer software and a particular type of malicious software as training data 160 and, after computation, outputs the trained classification function. In one particular embodiment, model 130 takes the form of a computer file. Training of the classification algorithm uses a database of positive samples (benign computer software) and negative samples (computer software that is known malware).

In the particular embodiment that makes use of the SVM Light software, there are two executable application files provided: svm_learn and svm_classify. The training application svm_learn accepts as input the feature definition file and training data 160, i.e., any number of known malicious and known benign software applications, and can be controlled by two parameters. The output of the training application provides a measurement of the effectiveness of the malware classifier.

The first parameter accepted by the training application ("-c") controls the trade-off between the margin and the number of misclassified samples. The value of the parameter is selected by the user and is often determined experimentally using a validation set. Larger values often lead to fewer support vectors, a larger VC dimension, a smaller training error and a smaller margin. The second parameter ("-t") selects a kernel function. SVM Light has four predefined kernel functions: a linear function (the default), a polynomial function, an RBF function and a sigmoid function. A user may also define a custom kernel function by modifying the source code.

The output of the training application includes the values VC (Vapnik-Chervonenkis) dimension, precision, recall, accuracy and error. The value VC dimension measures the capacity of the trained model; choosing a model with a smaller VC dimension leads to results that are less likely to be over fit. Precision is the proportion of retrieved items that are relevant, i.e., the ratio of true positives to the sum of true positives and false positives. Recall is the proportion of relevant items that are retrieved to the total number of relevant items in the data set, i.e., the ratio of true positives to the sum of true positives and false negatives. Accuracy is the portion of correctly classified samples, i.e., the ratio of true positives and true negatives to the sum of items in the data set. Error is the portion of incorrectly classified samples, i.e., the ratio of false positives and false negatives to the sum of items in the data set.

The values of precision, recall and error estimate the potential performance of the malware classifier on new samples, not the actual measurement of performance on the training samples.

Figure 9:
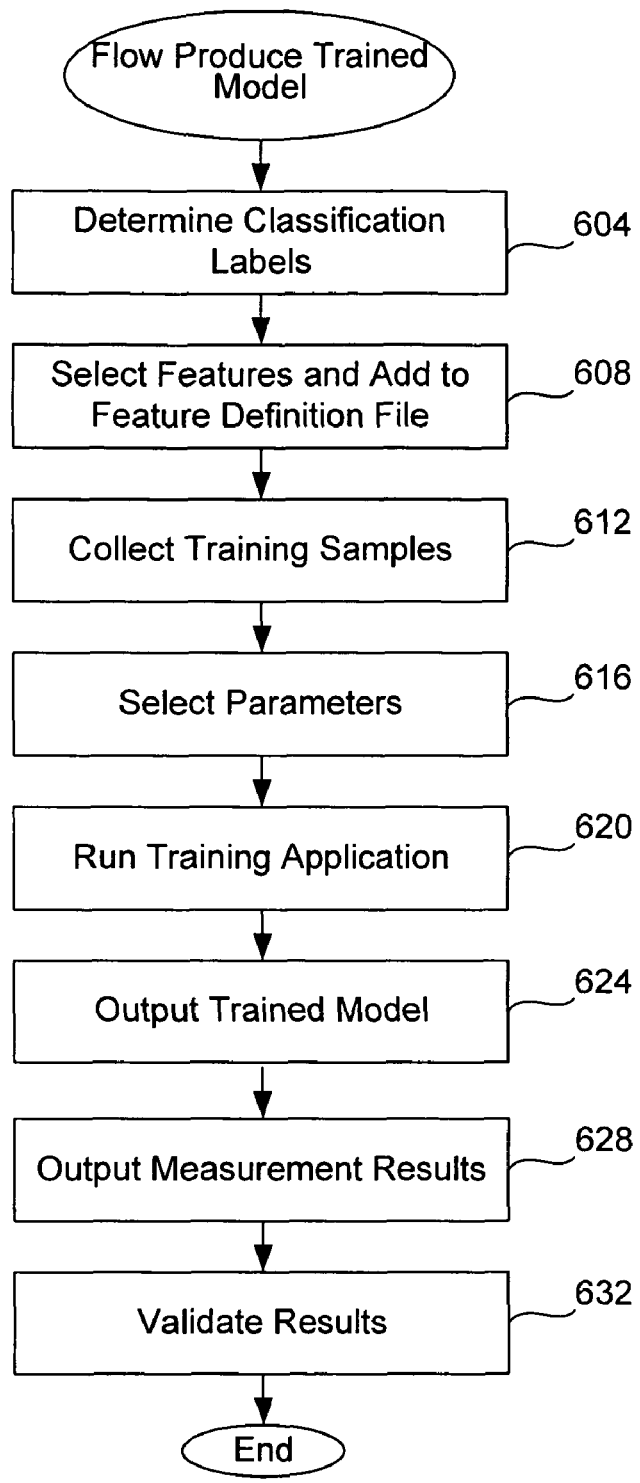
FIG. 9 is a flow diagram describing training of the classification algorithm and the creation of a trained model.

FIG. 9 is a flow diagram describing training of the classification algorithm and the creation of trained model 130. As a threshold matter, it is determined whether to create a trained model to detect worms, spyware, adware, or dialers, etc. Once it is determined for which type of malware to screen, in step 604 classification labels are determined. For example, if the model is to be trained to detect computer worms, then the possible classification labels are either "worm" or "normal." In step 608 appropriate features relevant to the detection of a computer worm (for example) are selected and added to a feature definition file. Examples of feature definition files are presented below. In this particular embodiment, the feature definition file includes features specific to the detection of a computer worms.

The selection of features relevant to the detection of a computer worm (for example) involves an engineer's experience, background knowledge and analysis of computer worms. Selection of features relevant to the detection of other types of malware also involve knowledge of that particular type of malware. Examples of suitable relevant features for three types of malware are shown below.

In step 612 training samples are collected and stored, for example, in folders on the computer. Training samples would include any number of known computer worms (i.e., on the order of thousands) as well as a wide variety of different types of benign software files and applications. The known computer worms are placed into one folder identified as containing worms, and the benign software is placed into another folder identified as such. Such organization may be performed manually or is automated. It is preferable that the examples of benign software include many different types of software documents and software applications, including many popular applications, in order to provide a better trained model. In step 616 parameters are selected for the training application as discussed above. One technique for choosing the best parameters is simply trial and error. Once the model is trained it is then used to classify known worms and known benign applications; if the results are not good (i.e. too many false positives) then the parameters are modified and the training application is run again to produce a new model.

In step 620 training application 145 is executed using feature definition file 120 and training data 160 as input to produce trained model 130 in step 624. In step 628 measurement results are also output (as described above) and the model can be validated in step 632 by using known types of normal software and malware. Preferably, validation includes giving the malware classifier computer worms that have not been used before by the training application.

Worm Classification Example

The following example describes feature selection, training parameters and results for a malware classifier designed to detect computer worms. As mentioned above, the three categories of features selected are characteristics of the software, commonly used dynamic link libraries and function names, and strings commonly seen in computer worms.

FIGS. 10A-10E show portions of feature definition file 120 that include the above categories of features pertaining to computer worms. FIG. 10A shows characteristics 704 found in the header of a portable executable format file. FIGS. 10B, 10C and 10C show features representing commonly used dynamic link libraries and function names. As shown, reference numerals 708-752 lists particular function names along with their associated dynamic link library name. FIGS. 10E and 10F show features of the feature definition file corresponding to strings commonly seen in computer worms. Shown are registry keys 756, common passwords 760, commonly accessed games 764, an HTTP string 768, a script string 772, commonly used e-mail strings 776, HTML strings 780, strings commonly present in malicious Windows batch files 784, and commonly used peer-to-peer strings 788.

Before training the model the feature values are first normalized, i.e., the values are transformed so that they fall between 0 and 1. By choosing the default linear kernel function the results are quite good; true positives are around 90% and false positives are around 0.5%. Use of a polynomial function provides even better results but at the expense of sacrificing a larger value for VC dimension. The training data includes about 2,000 known computer worms and about 7,000 normal (i.e., benign) software applications. Three different models are trained: a model using a polynomial kernel function, a model using a linear kernel functions, and a model using a polynomial kernel function with a low false-positive rate. Once the models are trained, the classification application svm_classify is used to validate the results against the training data.

The particular command line and parameters used in training SVM Light with a polynomial function is:

```
svm_learn.exe-c0.01-t1-d2
```

This particular model resulted in true positives of about 92.54% and false positives of about 0.01138%. The VC dimension value is 8288. The general XiAlpha estimation is an error value of less than or equal to 7.15%, the recall value is greater than or equal to 95.06%, and the precision value is greater than or equal to 96.04%.

The particular command line and parameters used in training SVM Light with a linear function is:

svm_learn.exe-c0.01-t0

This particular model resulted in true positives of about 86.03% and false positives of about 0.17078%. The VC dimension value is 243. The general XiAlpha estimation is an error value of less than or equal to 6.27%, the recall value is greater than or equal to 97.31%, and the precision value is greater than or equal to 95.03%.

The particular command line and parameters used in training SVM Light with the second polynomial function is:

svm_learn.exe-c0.01-dj10

This model is generated by choosing a large margin and a high penalty on a false positive rate. This particular model results in true positives of about 82.61% and false positives of about 0%. The VC dimension value is 368. The general XiAlpha estimation is an error value of less than or equal to 6.98%, the recall value is greater than or equal to 98.93%, and the precision value is greater than or equal to 92.88%.

The above-mentioned models were all generated using computer worms samples from 2004. Once the models have been trained and validated each classifier is tested against new data. In order to determine how effective each model is against unknown computer worms, each classifier was tested against computer worms discovered in January, 2005. The results indicate that true positives for the linear kernel model is 91.53%, true positives for the polynomial kernel model is 91.53%, and true positives for the polynomial kernel with a low false positive rate is 84.15%. In order to check false positives, each classifier was run on several personal computers and directed to classify all files found in a portable executable format. The results were between 0.23% and 0.1%.

FIG. 11 is an example showing a trained model 810 output by the training application for the purposes of detecting a computer worm. Shown are parameters 820 used in the creation of the model, information regarding the classifier 830 including use of a linear function, and a string of parameter values 840 used for training.

Computer System Embodiment

Figure 12A:
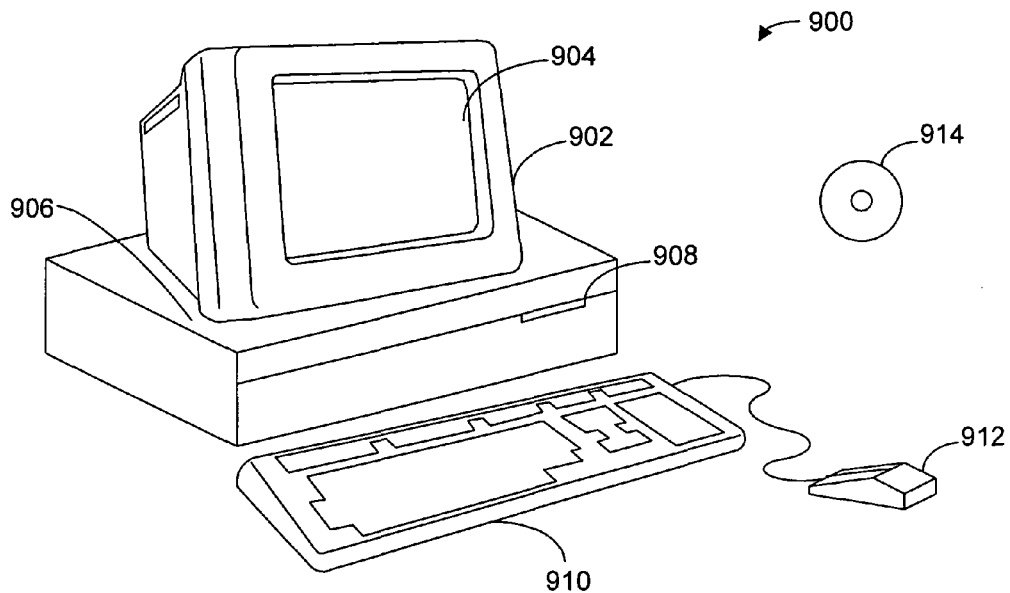
FIGS. 12A and 12B illustrate a computer system suitable for implementing embodiments of the present invention.
Figure 12B:
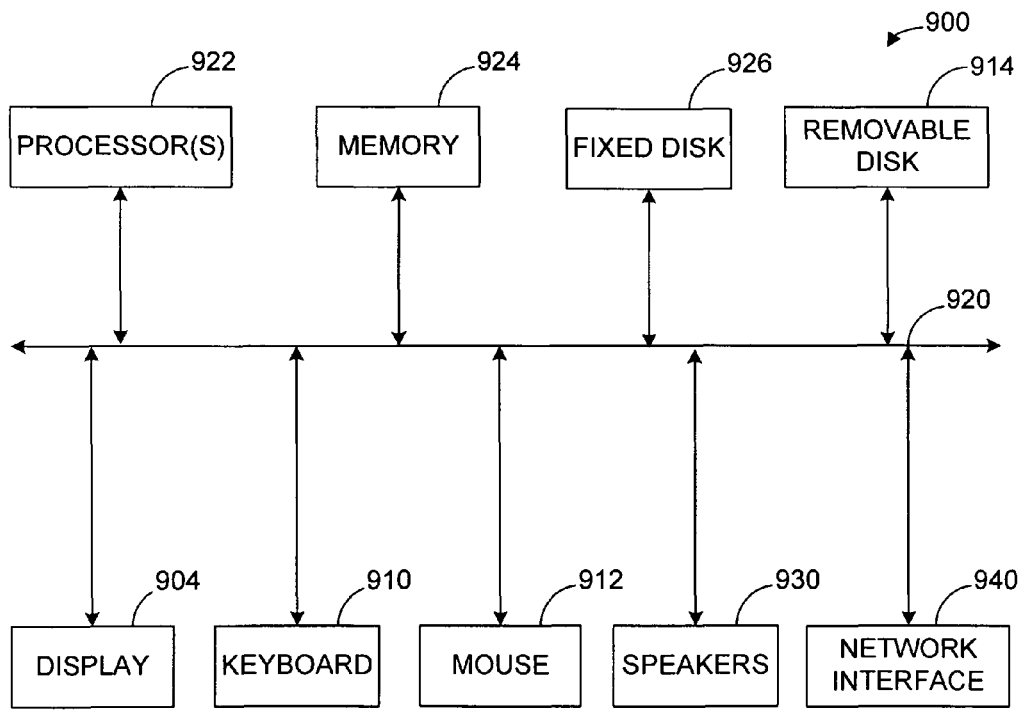

FIGS. 12A and 12B illustrate a computer system 900 suitable for implementing embodiments of the present invention. FIG. 12A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 12B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

Spyware Feature Definition File Example

As previously mentioned, the present invention may be used to detect a wide variety of types of malware. Listed below is an example feature definition file for detecting spyware.

```
<?xml version='1.0'?>
<mdxml version="0.1">
    <metadata version="0.1.0.medium">
        <feature-set name="pe-header">
            <feature name="pe/number-of-sections" range="0,30"/>
```

-continued
```xml
        <feature name="pe/length" range="0,3978672"/>
        <feature name="pe/subsystem" categories="0,1,2,3,5,7"/>
        <feature name="pe/code-size"/>
        <feature name="pe/initialized-data-size"/>
        <feature name="pe/uninitialized-data-size"/>
        <feature name="pe/entry-point-location"/>
        <feature name="pe/image-base"
categories="0x01000000, 0x00400000"/>
        <feature name="pe/import-table-size"/>
        <feature name="pe/resource-table-size"/>
        <feature name="pe/count-imported-dlls" range="0,47"/>
        <feature name="pe/count-imported-functions"
range="0,1000"/>
        <feature name="pe/shell" categories="none,upx,aspack"/>
    </feature-set>
    <feature-set name="spyware-dll-usage">
        <feature name="dll/kernel32.dll" range="0,826"/>
        <feature name="dll/user32.dll" range="0,695"/>
        <feature name="dll/advapi32.dll" range="0,565"/>
        <feature name="dll/shell32.dll" range="0,406"/>
        <feature name="dll/ole32.dll" range="0,304"/>
        <feature name="dll/gdi32.dll" range="0,543"/>
        <feature name="dll/oleaut32.dll" range="0,360"/>
        <feature name="dll/wininet.dll" range="0,208"/>
        <feature name="dll/comctl32.dll" range="0,82"/>
        <feature name="dll/msvcrt.dll" range="0,779"/>
        <feature name="dll/rasapi32.dll" range="0,145"/>
        <feature name="dll/version.dll" range="0,16"/>
        <feature name="dll/comdlg32.dll" range="0,26"/>
        <feature name="dll/wsock32.dll" range="0,75"/>
        <feature name="dll/mfc42.dll" range="0,6933"/>
        <feature name="dll/rpcrt4.dll" range="0,471"/>
        <feature name="dll/shlwapi.dll" range="0,749"/>
        <feature name="dll/urlmon.dll" range="0,77"/>
        <feature name="dll/ws2_32.dll" range="0,109"/>
        <feature name="dll/msvbvm60.dll" range="0,634"/>
        <feature name="dll/winspool.drv" range="0,167"/>
        <feature name="dll/winmm.dll" range="0,198"/>
        <feature name="dll/lz32.dll" range="0,13"/>
    </feature-set>
    <feature-set name="spyware-function-usage">
        <feature name="api/GetProcAddress"/>
        <feature name="api/ExitProcess"/>
        <feature name="api/LoadLibraryA"/>
        <feature name="api/RegCloseKey"/>
        <feature name="api/GetModuleHandleA"/>
        <feature name="api/CloseHandle"/>
        <feature name="api/GetModuleFileNameA"/>
        <feature name="api/WriteFile"/>
        <feature name="api/GetLastError"/>
        <feature name="api/GetCommandLineA"/>
        <feature name="api/MultiByteToWideChar"/>
        <feature name="api/CreateFileA"/>
        <feature name="api/GetStartupInfoA"/>
        <feature name="api/WideCharToMultiByte"/>
        <feature name="api/SetFilePointer"/>
        <feature name="api/VirtualAlloc"/>
        <feature name="api/ReadFile"/>
        <feature name="api/VirtualFree"/>
        <feature name="api/RegQueryValueExA"/>
        <feature name="api/RtlUnwind"/>
        <feature name="api/GetFileType"/>
        <feature name="api/GetStdHandle"/>
        <feature name="api/lstrlenA"/>
        <feature name="api/MessageBoxA"/>
        <feature name="api/FreeLibrary"/>
        <feature name="api/RegOpenKeyExA"/>
        <feature name="api/CoInitialize"/>
        <feature name="api/lstrcpyA"/>
        <feature name="api/Sleep"/>
        <feature name="api/GetCurrentProcess"/>
        <feature name="api/ShellExecuteA"/>
        <feature name="api/InitializeCriticalSection"/>
        <feature name="api/LeaveCriticalSection"/>
        <feature name="api/EnterCriticalSection"/>
        <feature name="api/RegSetValueExA"/>
        <feature name="api/DeleteCriticalSection"/>
        <feature name="api/SetEndOfFile"/>
        <feature name="api/HeapAlloc"/>
        <feature name="api/HeapFree"/>
        <feature name="api/SendMessageA"/>
        <feature name="api/GetVersionExA"/>
        <feature name="api/GetCurrentThreadId"/>
        <feature name="api/DeleteFileA"/>
        <feature name="api/GetDC"/>
        <feature name="api/RaiseException"/>
        <feature name="api/LocalFree"/>
        <feature name="api/UnhandledExceptionFilter"/>
        <feature name="api/HeapDestroy"/>
        <feature name="api/TerminateProcess"/>
        <feature name="api/GetFileSize"/>
        <feature name="api/GetCPInfo"/>
        <feature name="api/HeapCreate"/>
        <feature name="api/GetACP"/>
        <feature name="api/HeapReAlloc"/>
        <feature name="api/GetVersion"/>
        <feature name="api/GetEnvironmentStrings"/>
        <feature name="api/SetHandleCount"/>
        <feature name="api/GetStringTypeW"/>
        <feature name="api/SetTimer"/>
        <feature name="api/InterlockedDecrement"/>
        <feature name="api/wsprintfA"/>
        <feature name="api/GetOEMCP"/>
        <feature name="api/ShowWindow"/>
        <feature name="api/GetStringTypeA"/>
        <feature name="api/LCMapStringA"/>
        <feature name="api/FreeEnvironmentStringsA"/>
        <feature name="api/CoCreateInstance"/>
        <feature name="api/FreeEnvironmentStringsW"/>
        <feature name="api/GetEnvironmentStringsW"/>
        <feature name="api/RegCreateKeyExA"/>
        <feature name="api/LCMapStringW"/>
        <feature name="api/DispatchMessageA"/>
        <feature name="api/InterlockedIncrement"/>
        <feature name="api/CreateThread"/>
        <feature name="api/InternetOpenA"/>
        <feature name="api/CreateDirectoryA"/>
        <feature name="api/SetWindowPos"/>
        <feature name="api/WaitForSingleObject"/>
        <feature name="api/DefWindowProcA"/>
        <feature name="api/DeleteObject"/>
        <feature name="api/GetClientRect"/>
        <feature name="api/FindFirstFileA"/>
        <feature name="api/lstrcpynA"/>
        <feature name="api/RegDeleteKeyA"/>
        <feature name="api/LocalAlloc"/>
        <feature name="api/FindClose"/>
        <feature name="api/PostQuitMessage"/>
        <feature name="api/GetWindowTextA"/>
        <feature name="api/BitBlt"/>
        <feature name="api/TranslateMessage"/>
        <feature name="api/lstrcatA"/>
        <feature name="api/EnableWindow"/>
        <feature name="api/CreateWindowExA"/>
        <feature name="api/LoadIconA"/>
        <feature name="api/GetTempPathA"/>
        <feature name="api/GetWindowRect"/>
        <feature name="api/GetLocaleInfoA"/>
        <feature name="api/FlushFileBuffers"/>
        <feature name="api/IsWindow"/>
        <feature name="api/CreateProcessA"/>
        <feature name="api/DestroyWindow"/>
        <feature name="api/LoadCursorA"/>
        <feature name="api/SelectObject"/>
        <feature name="api/SetStdHandle"/>
        <feature name="api/SetWindowTextA"/>
        <feature name="api/GetDlgItem"/>
        <feature name="api/PostMessageA"/>
        <feature name="api/lstrcmpiA"/>
        <feature name="api/RegDeleteValueA"/>
        <feature name="api/SetWindowLongA"/>
        <feature name="api/GetTickCount"/>
        <feature name="api/GetWindowsDirectoryA"/>
        <feature name="api/RasDialA"/>
        <feature name="api/GetMessageA"/>
        <feature name="api/KillTimer"/>
        <feature name="api/GetThreadLocale"/>
        <feature name="api/CharNextA"/>
        <feature name="api/SetFocus"/>
        <feature name="api/GetStockObject"/>
```

15
-continued

```xml
<feature name="api/CreateSolidBrush"/>
<feature name="api/GetWindowLongA"/>
<feature name="api/CopyFileA"/>
<feature name="api/GetSystemMetrics"/>
<feature name="api/EndDialog"/>
<feature name="api/VirtualQuery"/>
<feature name="api/LoadLibraryExA"/>
<feature name="api/SetTextColor"/>
<feature name="api/EndPaint"/>
<feature name="api/TlsGetValue"/>
<feature name="api/BeginPaint"/>
<feature name="api/TlsSetValue"/>
<feature name="api/CoUninitialize"/>
<feature name="api/SetBkMode"/>
<feature name="api/LoadStringA"/>
<feature name="api/GlobalAlloc"/>
<feature name="api/VerQueryValueA"/>
<feature name="api/GetLocalTime"/>
<feature name="api/DeleteDC"/>
<feature name="api/GetSysColor"/>
<feature name="api/GetDeviceCaps"/>
<feature name="api/FindResourceA"/>
<feature name="api/HeapSize"/>
<feature name="api/CreateCompatibleDC"/>
<feature name="api/GetEnvironmentVariableA"/>
<feature name="api/InvalidateRect"/>
<feature name="api/LoadResource"/>
<feature name="api/FillRect"/>
<feature name="api/SetLastError"/>
<feature name="api/IsBadReadPtr"/>
<feature name="api/GetParent"/>
<feature name="api/DialogBoxParamA"/>
<feature name="api/CreateMutexA"/>
<feature name="api/SystemParametersInfoA"/>
<feature name="api/SetUnhandledExceptionFilter"/>
<feature name="api/CompareStringA"/>
<feature name="api/PeekMessageA"/>
<feature name="api/InternetCloseHandle"/>
<feature name="api/IsBadCodePtr"/>
<feature name="api/IsBadWritePtr"/>
<feature name="api/SetBkColor"/>
<feature name="api/RemoveDirectoryA"/>
<feature name="api/GetObjectA"/>
<feature name="api/GlobalFree"/>
<feature name="api/TlsAlloc"/>
<feature name="api/FindWindowA"/>
<feature name="api/GetDesktopWindow"/>
<feature name="api/FindNextFileA"/>
<feature name="api/SetForegroundWindow"/>
<feature name="api/GetSystemTime"/>
<feature name="api/InternetReadFile"/>
<feature name="api/SizeofResource"/>
<feature name="api/GetWindow"/>
<feature name="api/EnumWindows"/>
<feature name="api/GetCurrentProcessId"/>
<feature name="api/ReleaseDC"/>
<feature name="api/RegisterClassA"/>
<feature name="api/lstrcmpA"/>
<feature name="api/GetShortPathNameA"/>
<feature name="api/GetFileAttributesA"/>
<feature name="api/GlobalUnlock"/>
<feature name="api/GlobalLock"/>
<feature name="api/SendDlgItemMessageA"/>
<feature name="api/lstrlenW"/>
<feature name="api/GetSystemDirectoryA"/>
<feature name="api/MulDiv"/>
<feature name="api/GetTempFileNameA"/>
<feature name="api/SetDlgItemTextA"/>
<feature name="api/GetTimeZoneInformation"/>
<feature name="api/GetFileVersionInfoA"/>
<feature name="api/DrawTextA"/>
<feature name="api/CreateFontIndirectA"/>
<feature name="api/GetClassNameA"/>
<feature name="api/UpdateWindow"/>
<feature name="api/exit"/>
<feature name="api/CoTaskMemFree"/>
<feature name="api/LoadImageA"/>
<feature name="api/SetEnvironmentVariableA"/>
<feature name="api/GetDlgItemTextA"/>
<feature name="api/CreateFontA"/>
```

16
-continued

```xml
        <feature name="api/GetSystemInfo"/>
        <feature name="api/CompareStringW"/>
        <feature name="api/free"/>
        <feature name="api/CallWindowProcA"/>
        <feature name="api/RegOpenKeyA"/>
        <feature name="api/OpenProcess"/>
        <feature name="api/FormatMessageA"/>
        <feature name="api/ScreenToClient"/>
        <feature name="api/RegEnumValueA"/>
        <feature name="api/RegEnumKeyExA"/>
        <feature name="api/SHGetSpecialFolderPathA"/>
    </feature-set>
    <feature-set name="spyware-full">
        <feature-set-ref name="pe-header"/>
        <feature-set-ref name="spyware-dll-usage"/>
        <feature-set-ref name="spyware-function-usage"/>
    </feature-set>
  </metadata>
</mdxml>
```

Dialer Feature Definition File Example

As previously mentioned, the present invention may be used to detect a wide variety of types of malware. Listed below is an example feature definition file for detecting dialer malware. One of skill in the art, upon a reading of the specification and the examples contained herein, would be able to use invention to detect a variety of other types of malware.

```xml
<?xml version="1.0" encoding="iso-8859-1"?>
<mdxml version="0.1">
    <metadata version="0.1">
        <!-- Searching for web browsers -->
        <feature-set name="web-browser">
            <feature name="match/opera.exe"/>
            <feature name="match/netscape.exe"/>
            <feature name="match/iexplore.exe"/>
            <feature name="match/Internet Explorer"/>
            <feature name="match/Netscape"/>
            <feature name="match/Opera"/>
            <feature name="match/network.proxy.type"/>
            <feature name="match/nsreg.dat"/>
        </feature-set>
        <!-- Access to web browsers' setttings -->
        <feature-set name="browser-hack" mode="postfix">
<feature name="match/Software\Microsoft\Internet Explorer\Toolbar\WebBrowser"/>
<feature name="match/Software\Microsoft\Windows\CurrentVer-
            sion\Internet Settings"/>
<feature name="match/Software\Netscape\Netscape Navigator\Users"/>
<feature name="match/Software\Netscape\Netscape Navigator\biff"/>
        <feature name="match/Software\Netscape\Netscape
Navigator\Main"/>
        <feature name="match/Software\Microsoft\Internet
Explorer\Main"/>
        <feature name="match/http\shell\open\command"/>
        <feature name="match/htmlfile\shell\open\command"/>
    </feature-set>
    <!-- List of countries -->
    <feature-set name="countries" mode="exact">
        <feature name="match/countries" pattern="
        Domestic Premium,Diggo Garcia,Licthenstein,Solomon
        Island,Domestic UK,Norfolk Island,Domestic Switzerland,
        Domestic Spain,Central Africa,Domestic New Zealand,NZ
            Mobiel,United Kingdom,Domestic Italy,Cook Island,
        Domestic Germany, Domestic Call,Lichtenstein,Nauru,Sao
            Tome,Domestic Belgium,Diego Garcia,Domestic
Austria,
        Domestic Australia,NZ
    Mobile,Zimbabwe,Yemen,Venezuela,Uruguay,Ukraine,U.A.E,Turkey,
        Tunisia,Thailand,Taiwan,Syria,Switzerland,Sweden,Spain,South
            Africa,Slovenia,Slovak Republic,Singapore,Serbia,
```

-continued

```
SaudiArabia,Russia,Romania,Qatar,Portugal,Poland,Philippines,Paraguay,
Panama,Pakistan,Norway,Nicaragua,
        New
Zealand,Netherlands,Morocco,Monaco,Mexico, Malaysia, Macedonia,
Macau,Luxembo urg,Lithuania,Liechtenstein,
        Libya,Lebanon,Latvia,Kuwait,Korea South, Korea
North,Kenya,Kazakhstan,Jordan,Japan,Jamaica,Italy,Israel,
        Ireland,Indonesia,Indian,Iceland,Hungary,Hong
Kong,Honduras,Guatemala,Greenland,Greece,Germany,Georgia,
            France,Finland,Faeroe Islands,Estonia,El
Salvador,Egypt,Ecuador,Dominica,Denmark,Czech Republic,Croatia,
            Costa
Rica,Colombia,China,Chile,Canada,Bulgaria,Brunei,Brazil,Bolivia,Bel-
ize,
,Bel gium,Belarus,Barbados,
    Bahrain,Austria,Australia,Aruba,Armenia,Argentina,Algeria,Albania,
Kiribati"/>
    </feature-set>
    <!-- TAPI functions -->
    <feature-set name="tapi" mode="winapi">
        <feature name="match/tapi32.dll" mode="exact"/>
        <feature name="match/lineClose"/>
        <feature name="match/lineGetDevCaps"/>
        <feature name="match/lineInitializeEx"/>
        <feature name="match/lineNegotiateAPIVersion"/>
        <feature name="match/lineOpen"/>
        <feature name="match/lineShutdown"/>
    </feature-set>
    <!-- RASAPI functions -->
    <feature-set name="rasapi" mode="winapi">
        <feature name="match/rasapi32.dll" mode="exact"/>
        <feature name="match/RasEnumDevices"/>
        <feature name="match/RasEnumConnections"/>
        <feature name="match/RasGetConnectStatus"/>
        <feature name="match/RasHangUp"/>
        <feature name="match/RasDial"/>
        <feature name="match/RasSetEntryDialParams"/>
        <feature name="match/RasDeleteEntry"/>
        <feature name="match/RasSetEntryProperties"/>
    </feature-set>
    <!-- WinInet functions -->
    <feature-set name="wininet" mode="winapi">
        <feature name="match/InternetOpen"/>
    </feature-set>
    <!-- Registry keys for automatically start up -->
    <feature-set name="auto-startup" mode="postfix">
        <feature name="match/CurrentVersion\Explorer\Shell
Folders"/>
        <feature name="match/CurrentVersion\Explorer\User Shell
Folders"/>
        <feature name="match/CurrentVersion\Run"/>
        <feature name="match/CurrentVersion\RunOnce"/>
        <feature name="match/CurrentVersion\RunServices"/>
        <feature name="match/CurrentVersion\RunServicesOnce"/>
        <feature name="match/txtfile\shell\open\command"/>
        <feature name="match/exefile\shell\open\command"/>
    </feature-set>
    <!-- Dialer detecting -->
    <feature-set name="dialer-full" public="true">
        <feature name="pe/packed"/>
        <feature name="match/http://" mode="prefix"/>
        <feature name="match/dialer" mode="word"/>
        <feature name="match/disconnect" mode="word"/>
        <feature name="match/wait" mode="word"/>
<feature name="match/hangup" pattern="hangup,hang up" mode="word"/>
<feature name="match/authentication"
pattern="authentication,authenticate"/>
        <feature name="match/adult" mode="word"/>
<feature name="match/eighteen" pattern="eighteen,18" mode="word"/>
        <feature name="match/bill" mode="word"/>
        <feature name="match/modem" mode="word"/>
<feature name="match/CurrentControlSet\Services\Tcpip\Parameters"
        mode="postfix"/>
        <feature name="match/drivers\etc\hosts" mode="postfix"/>
        <feature-set-ref name="web-browser"/>
        <feature-set-ref name="browser-hack"/>
        <feature-set-ref name="countries"/>
        <feature-set-ref name="tapi"/>
        <feature-set-ref name="rasapi"/>
        <feature-set-ref name="wininet"/>
```

-continued

```
        <feature-set-ref name="auto-startup"/>
    </feature-set>
    </metadata>
</mdxml>
```

I claim:

1. A method of training a malware classifier, said method comprising:

determining a classification label that represents a type of malware, said type of malware not including benign software;

determining a classification label that represents a second type of malware;

creating a feature definition file that includes first features relevant to the classification of said type of malware and that includes second features relevant to the classification of said second type of malware, wherein said first and second features are combined into one feature set in said feature definition file, wherein said features include characteristics of said type of malware, DLL names and function names executed by said type of malware, and alphanumeric strings used by said type of malware;

selecting software training data including software of the same type as said type of malware and software that is benign;

executing a training application on a computer associated with said malware classifier and inputting said feature definition file and said software training data into said training application; and outputting a training model associated with said malware classifier on said computer, whereby said training model is arranged to assist in the identification of said type of malware and said second type of malware.

2. A method as recited in claim 1 wherein said type of malware is a virus, a worm, a Trojan horse, a dropper, a wabbit, a fork bomb, spyware, adware, a backdoor, ratware, an exploit, a root kit, key logger software, a dialer or URL injection software.

3. A method as recited in claim 1 wherein said type of malware is a worm, spyware or a dialer.

4. A method as recited in claim 1 wherein said characteristics of said type of malware include header fields.

5. A method as recited in claim 4 wherein header fields include a packed field, a number of sections field, a code size field, an import table size field, and a resource table size field, all of a portable executable format.

6. A method as recited in claim 1 wherein said malware classifier is based on the support vector machine (SVM) algorithm.

7. A method as recited in claim 1 further comprising:

validating said training model by using as input into said malware classifier a previously un-used software program of said type of malware, said software program not being included in said software training data; and outputting said classification label for said previously un-used input software program indicating said type of malware.

8. A method as recited in claim 1 wherein executing a training application further comprises:

using a first parameter that controls a trade-off between a margin and one or more misclassified samples and a second parameter for selecting a kernel function.

9. A method of classifying a suspect software program, said method comprising:

- selecting a group of features relevant to the identification of a particular type of malware, wherein said particular type of malware does not include benign software and wherein said group of features include characteristics of said type of malware, DLL names and function names executed by said type of malware, and alphanumeric strings used by said type of malware;
- selecting a second group of features relevant to the identification of a second particular type of malware;
- combining said first and second groups of features into one selected feature set;
- selecting a trained model, said trained model being trained to identify said particular type of malware and said second particular type of malware;
- extracting a subset of said first and second features and their corresponding values from said suspect software program utilizing said selected feature set;
- executing a classification algorithm on a computer and inputting said subset of features, said corresponding values, and said trained model, wherein said classification algorithm combines logic of classification functions for detecting said type of malware and said second type of malware; and
- outputting a classification label using said computer for said suspect software program that identifies said type of malware or said second type of malware.

10. A method as recited in claim 9 wherein said type of malware is a virus, a worm, a Trojan horse, a dropper, a wabbit, a fork bomb, spyware, adware, a backdoor, ratware, an exploit, a root kit, key logger software, a dialer or URL injection software.

11. A method as recited in claim 9 wherein said type of malware is a worm, spyware or a dialer.

12. A method as recited in claim 9 wherein said characteristics of said type of malware include header fields.

13. A method as recited in claim 12 wherein header fields include a packed field, a number of sections field, a code size field, an import table size field, and a resource table size field, all of a portable executable format.

14. A method as recited in claim 9 wherein said classification algorithm is based on the support vector machine (SVM) algorithm.

15. A method as recited in claim 8 further comprising:

- performing said steps of claim 8 using a malware classifier, wherein said malware classifier is integrated into an anti-spyware software product; and
- inputting said subset of features into said classification algorithm when said software program is accessed.

16. A malware classifier apparatus implemented on a computer for classifying suspect software, said malware classifier comprising:

- a feature definition file including first features relevant to the identification of a type of malware and second features relevant to the identification of a second particular type of malware, wherein said first and second features are combined into one feature set in said feature definition file, said type of malware not including benign software and, wherein said features include characteristics of said type of malware, DLL names and function names executed by said type of malware, and alphanumeric strings used by said type of malware;
- a trained model, said model being trained to identify said type of malware and said second particular type of malware;
- a feature extraction module arranged to accept as input computer software and said feature definition file and to extract a subset of said first and second features and their values from said computer software using a computer;
- a pattern classification algorithm that accepts said subset of features and their values and uses said trained model to output a classification label using said computer for said input computer software that identifies said type of malware or said second type of malware, wherein said pattern classification algorithm combines logic of classification functions for detecting said type of malware and said second type of malware.

17. The malware classifier apparatus as recited in claim 16 wherein said type of malware is a virus, a worm, a Trojan horse, a dropper, a wabbit, a fork bomb, spyware, adware, a backdoor, ratware, an exploit, a root kit, key logger software, a dialer or URL injection software.

18. The malware classifier apparatus as recited in claim 16 wherein said type of malware is a worm, spyware or a dialer.

19. The malware classifier apparatus as recited in claim 16 wherein said characteristics of said type of malware include header fields.

20. The malware classifier apparatus as recited in claim 19 wherein header fields include a packed field, a number of sections field, a code size field, an import table size field, and a resource table size field, all of a portable executable format.

21. The malware classifier apparatus as recited in claim 16 wherein said pattern classification algorithm is based on the support vector machine (SVM) algorithm.

22. The malware classifier apparatus as recited in claim 16 wherein said malware classifier apparatus is integrated into an anti-spyware software product, and wherein said computer software is input when said computer software is accessed.

* * * * *